United States Patent [19]

Motte

[11] Patent Number: 4,481,981
[45] Date of Patent: Nov. 13, 1984

[54] SOFT EDGE SEAT BELT WEBBING

[75] Inventor: Klaus B. Motte, Grosse Pointe Park, Mich.

[73] Assignee: General Motors Corporation, Detroit, Mich.

[21] Appl. No.: 477,339

[22] Filed: Mar. 21, 1983

[51] Int. Cl.³ .................... D03D 15/00; D03D 5/00; A62B 35/00
[52] U.S. Cl. .................... 139/426 R; 139/383 R; 428/90; 428/193
[58] Field of Search ........... 139/426 R, 420 R, 383 R, 139/385, 411; 428/193, 90

[56] References Cited

U.S. PATENT DOCUMENTS

| 1,332,390 | 3/1920 | Foster | 428/90 |
| 2,095,387 | 10/1937 | Huizeng | 139/384 R |
| 2,096,816 | 10/1937 | Lilley | 428/90 |
| 2,400,327 | 5/1946 | Womble | 139/426 R |
| 2,794,450 | 6/1957 | Gatzke | 139/411 |
| 3,968,283 | 7/1976 | Schutte | 428/90 |
| 4,018,960 | 4/1977 | Berger et al. | 428/193 |

FOREIGN PATENT DOCUMENTS 2343842 10/1977 France ............... 139/383 R

Primary Examiner—James Kee Chi
Attorney, Agent, or Firm—Charles E. Leahy

[57] ABSTRACT

A woven webbing for seat belts has a plurality of longitudinally extending yarn strands interwoven with transverse extending yarn strands. One or more of the edgemost of the longitudinally extending yarn strands is a flocked yarn. The flocked yarn is comprised of a carrier yarn having a multitude of flock fibers adhesively secured thereto and oriented perpendicular to the carrier yarn. The length of the flock fibers is sufficient to extend beyond the longitudinal and transverse extended yarn strands so that the flock fibers effectively soften the edge of the webbing for occupant comfort.

1 Claim, 3 Drawing Figures

SOFT EDGE SEAT BELT WEBBING

Invention relates to an improved webbing for use in automotive seat belts and more particularly provides a webbing having a flocked yarn woven into the webbing at the edges thereof to effectively soften the edge of the belt for comfort of the seat occupant.

BACKGROUND OF THE INVENTION

Motor vehicle seat belt systems conventionally include a webbing woven from yarn of nylon, rayon or polyester threads. The webbing is mounted on the vehicle body in a manner which disposes the webbing across the occupant lap and diagonally across the occupant's upper torso.

A disadvantage of conventional seat belt webbing, particularly when employed as a shoulder belt, is that the edge of the shoulder belt may chafe upon the neck or other exposed skin of the seat occupant giving rise to occupant annoyance even though such shoulder belt systems are known to provide effective restraint of the occupant during deceleration of the vehicle.

Prior to my making of this invention, it had been known to flock the entire webbing of a woven seat belt webbing so that the edges and surfaces of the webbing would be concealed beneath the flocking and the flocking would provide a soft surface. However, the presence of the flocking fibers on the surface of the belt effectively increases the thickness of the belt as the belt is wound and stored upon the reel of the seat belt retractor with the result that a retractor must be larger than what would otherwise be required in order to accommodate the diameter of the wound up belt.

It would be desirable to provide a seat belt webbing having the comfort enhancing qualities of a flocked seat belt webbing without increasing the thickness of the belt.

SUMMARY OF THE INVENTION

According to the invention, a woven webbing for seat belts has a plurality of warp elements extending longitudinally of the webbing and a plurality of weft elements extending transversely of the webbing and interwoven with the warp elements. At least the one or more edgemost of the plurality of warp elements are a flocked yarn so that the edge of the webbing is effectively softened for occupant comfort.

Accordingly, the object, feature and advantage of the invention resides in the provision of a flocked yarn woven into the seat belt webbing as the edgemost warp thereof so that the occupant comfort is enhanced by softening the edge of the webbing without increasing the thickness of the webbing.

BRIEF DESCRIPTION OF THE DRAWINGS

These and other features, objects and advantages of the invention will become apparent upon consideration of the specification and the appended drawings in which.

DESCRIPTION OF THE PREFERRED EMBODIMENT

Figure 1:
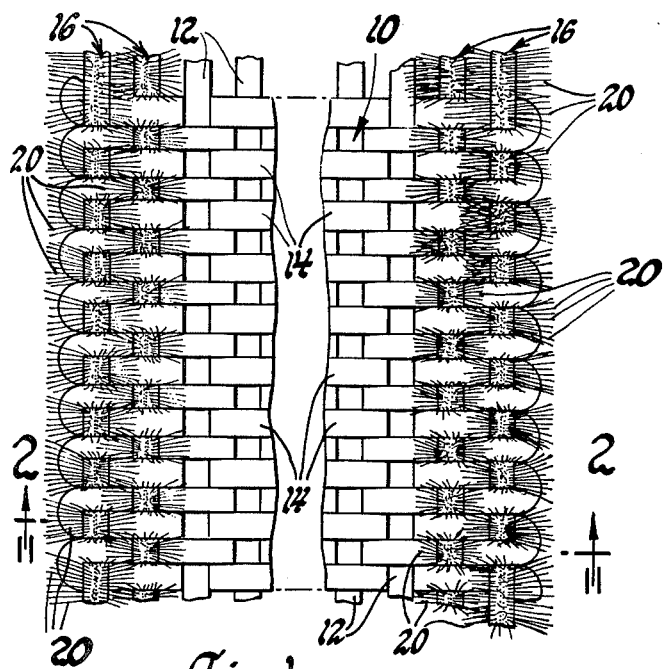
FIG. 1 is a plan view of a seat belt webbing according to the invention.
Figure 2:
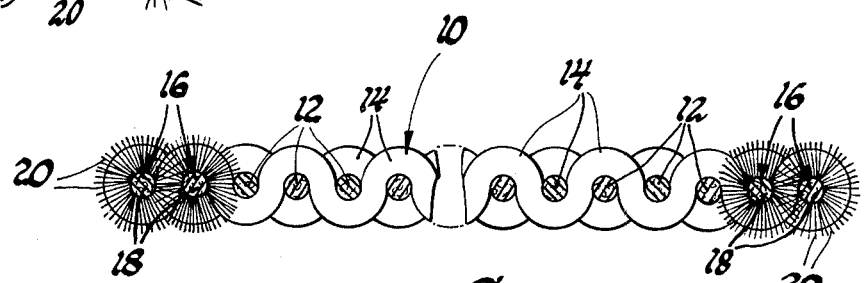
FIG. 2 is a sectional view taken in the direction of arrows 2—2 of FIG. 1.
Figure 3:
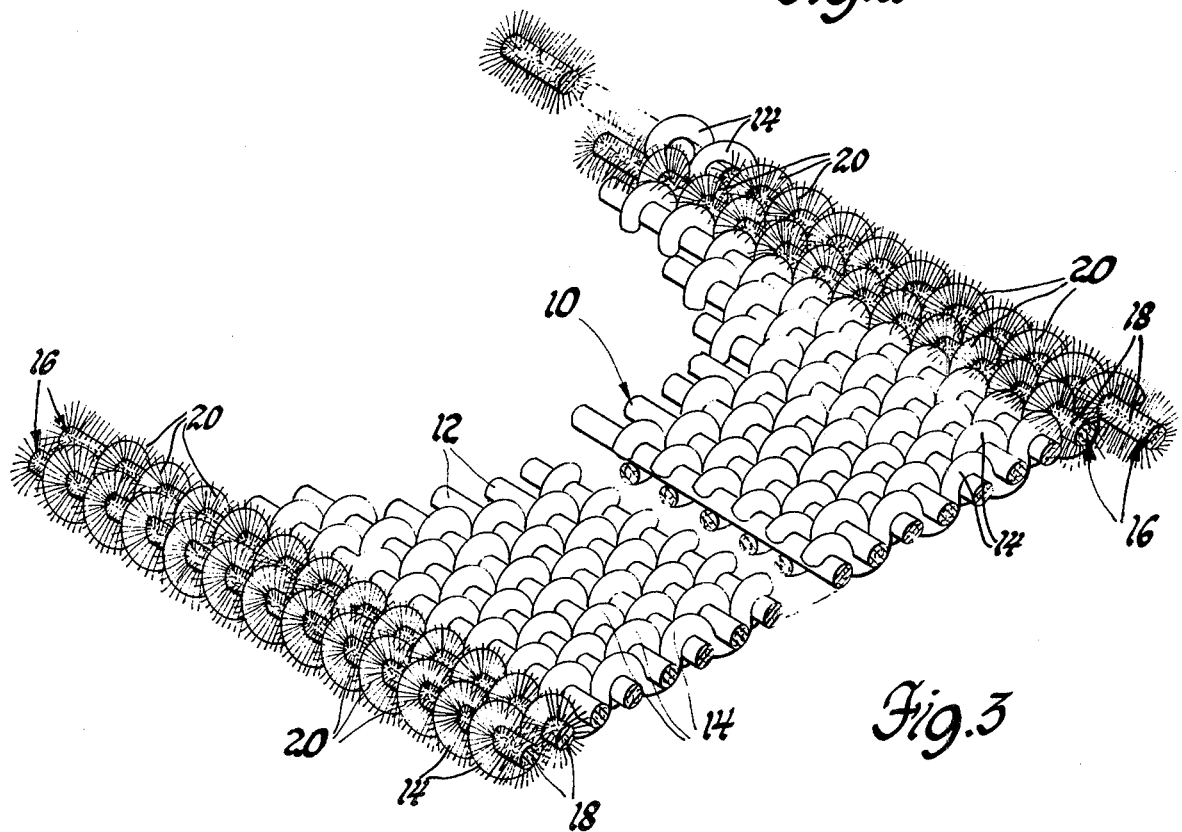
FIG. 3 is a perspective view of the seat belt webbing.

Referring to the drawings, there is shown a segment of woven seat belt webbing 10 which is comprised of a plurality of interwoven warp elements 12 which extend longitudinally of the webbing and a plurality of weft elements 14 which extend transversely of the webbing. The warp elements 12 and the weft elements 14 are preferably a yarn comprised of twisted threads of nylon, polyester, rayon or other material.

Referring again to the drawings, the two outer edgemost warp elements are a flocked yarn 16. The flocking is comprised of a plurality of short nylon, rayon, or polyester flock fibers 20 which are adhesively attached to a carrier warp yarn 18. The flock fibers 20 are oriented to stand perpendicular to the surface of the carrier warp yarn 18. The length of the flock fibers 20 is sufficient to project radially outwardly from the carrier warp yarn 18 and beyond the weft elements 14 so that the edge of the webbing 10 which would contact against the neck or other exposed skin of a restrained seat occupant would be the flock fibers 20 instead of the warp elements 12 or weft elements 14.

Thus, it will be understood that the invention provides a new and improved soft edge seat belt webbing in which the edgemost longitudinal extending warp elements are comprised of a flocked yarn in which the flock fibers have a length sufficient to extend beyond the surfaces of the weft and warp elements. Furthermore, although the drawings show a very simple weave pattern of the seat belt webbing, it will be understood that this invention is applicable to seat belt webbings of other weave patterns as well as to application of diverse webbing materials such as rayon, polyester, nylon, etc.

The embodiments of the invention in which an exclusive property or privilege is claimed are defined as follows:

1. In a woven webbing for a seat belt having warp elements extending longitudinally of the webbing and weft elements extending transversely of the webbing and interwoven with the warp elements, the improvement comprising:

only the edgemost one or more of the plurality of warp elements at at least the edge of the belt disposed adjacent the occupant exposed skin being a yarn having flock fibers secured thereon and oriented perpendicular from the yarn and having a length to extend beyond the surface of the webbing as defined by the interwoven weft elements and warp elements so that the flock fiber presents a soft webbing edge for enhanced comfort against the exposed skin of a seat occupant.

* * * * *